United States Patent
Brosh

(10) Patent No.: US 7,290,453 B2
(45) Date of Patent: Nov. 6, 2007

(54) COMPOSITE MEMS PRESSURE SENSOR CONFIGURATION

(76) Inventor: Amnon Brosh, 101 Ocean Dr., Ste. D402, Santa Monica, CA (US) 90402

( * ) Notice: Subject to any disclaimer, the term of this patent is extended or adjusted under 35 U.S.C. 154(b) by 44 days.

(21) Appl. No.: 11/299,611

(22) Filed: Dec. 12, 2005

(65) Prior Publication Data
US 2006/0144153 A1    Jul. 6, 2006

Related U.S. Application Data

(60) Provisional application No. 60/639,340, filed on Dec. 28, 2004.

(51) Int. Cl.
*G01L 7/08* (2006.01)
(52) U.S. Cl. .............................. 73/720; 73/726; 73/754
(58) Field of Classification Search .................. 73/720, 73/721, 726, 727, 754; 438/53, 48
See application file for complete search history.

(56) References Cited

U.S. PATENT DOCUMENTS

| | | | |
|---|---|---|---|
| 4,237,775 A | * | 12/1980 | Eisele ........................... 92/99 |
| 5,178,016 A | | 1/1993 | Dauenhauer et al. |
| 5,225,377 A | | 7/1993 | Hines et al. |
| 5,549,785 A | | 8/1996 | Sakai et al. |
| 5,926,692 A | | 7/1999 | Kurtz |
| 6,093,579 A | | 7/2000 | Sathe |
| 6,528,340 B2 | | 3/2003 | Haji-Sheikh et al. |

* cited by examiner

*Primary Examiner*—Abdre J. Allen
(74) *Attorney, Agent, or Firm*—Watov & Kipnes, P.C.; Kenneth Watov

(57) ABSTRACT

A pressure sensor assembly comprised of a single and dual layer diaphragm with integrated force sensing flexure, such as a cantilever beam. Strain gages are positioned on the force sensing beam. The pressure forces the diaphragm to deflect. The deflection is constrained by the beam, which is compelled to bend. The bending induces strains in strain gages located on the beam. The strain gages are connected in a Wheatstone bridge configuration. When a voltage is applied to the bridge, the strain gages provide an electrical output signal proportional to the pressure. Composite diaphragm— beam pressure sensors convert pressure more efficiently and improve sensor performance.

18 Claims, 11 Drawing Sheets

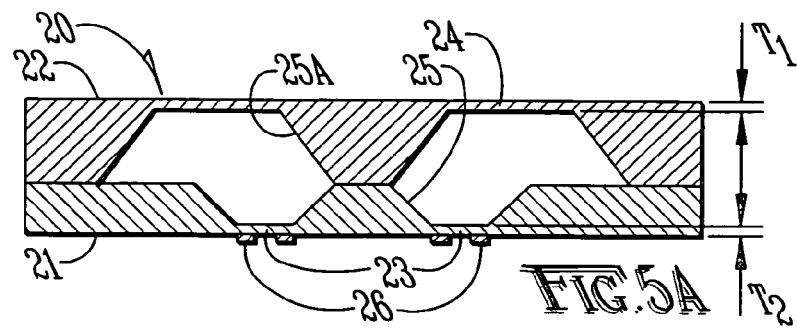
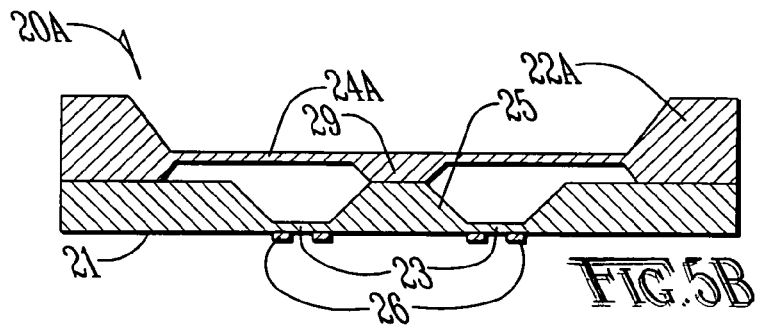
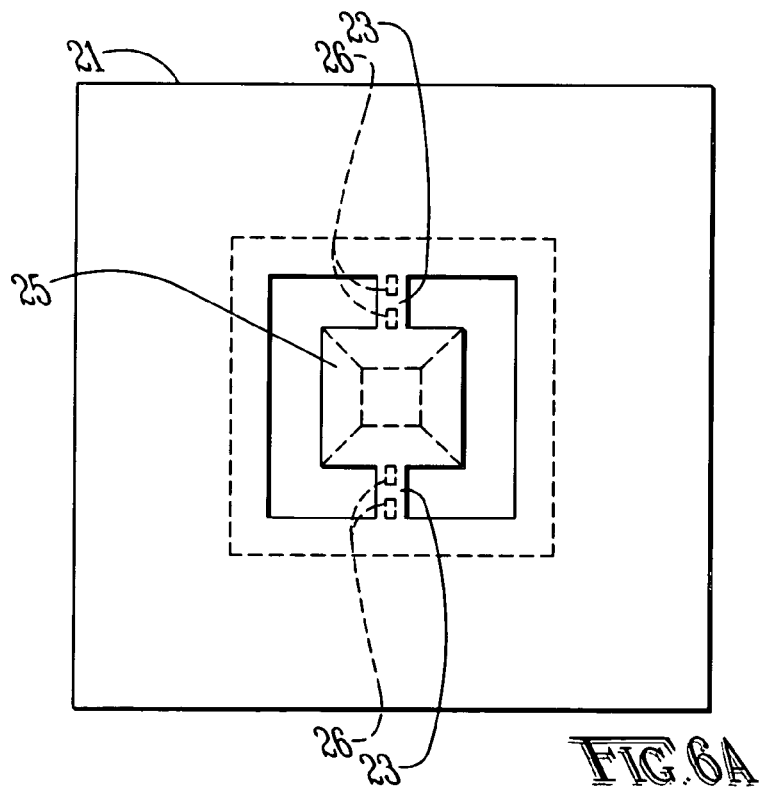

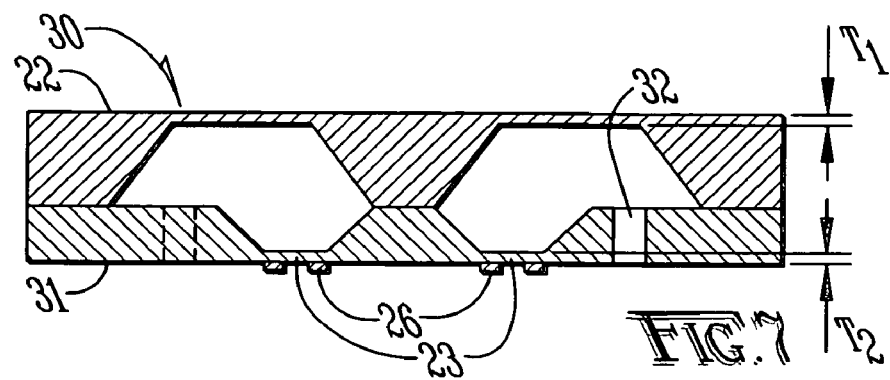
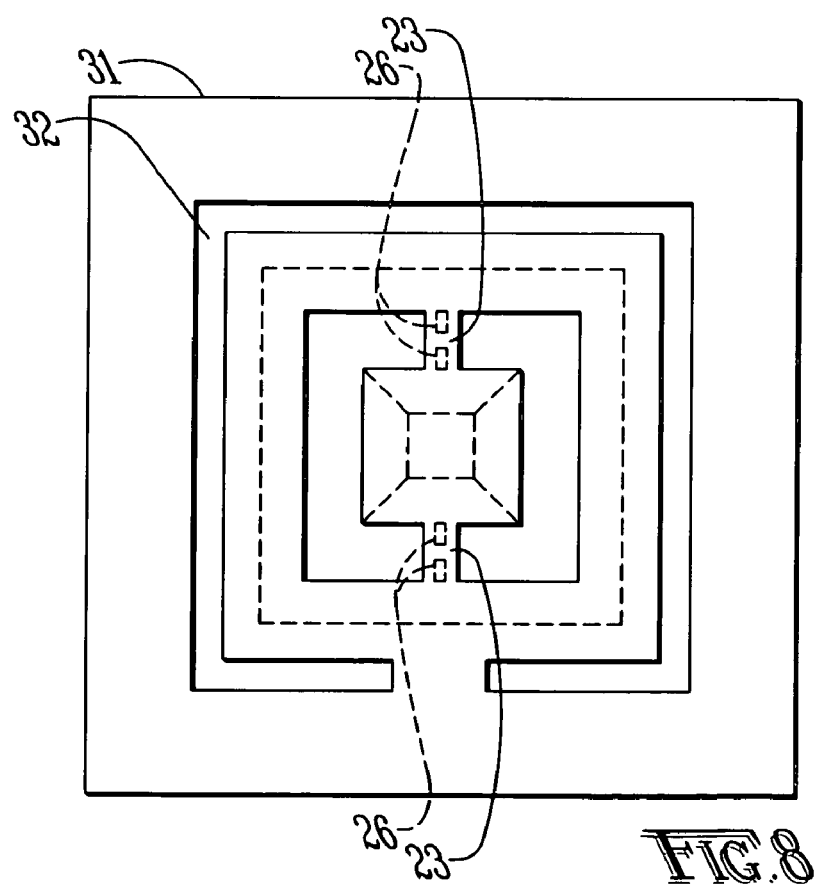

COMPOSITE MEMS PRESSURE SENSOR CONFIGURATION

This application claims priority from U.S. provisional patent application No. 60/639,340 entitled "Integral Pressure Sensing Die Configuration," filed oh Dec. 28, 2004. That application is incorporated fully by reference herein.

FIELD OF THE INVENTION

The present invention relates to piezoresistive pressure sensors that are used to measure pressure by converting pressure into strain, which is sensed by strain gages.

BACKGROUND OF THE INVENTION

Prior art piezoresistive pressure dies are based on plain or bossed diaphragms. Strain gages are placed on the diaphragms to sense the strains created by the pressure. The strains depend on diaphragm geometry. In order to produce adequate strains in low pressure range sensors, thin diaphragms must be used. Thin diaphragms exhibit a number of problems: Ballooning; Mid-plane stretching under applied load; Buckling; Sensitivity to in plane stresses by thermal expansion; Bi-metallic thermal effects; Relatively large boss required to implement the required stress concentration.

This causes performance problems: High thermal zero shift; Anomalous thermal span shifts (lower or higher); Nonlinearity; Zero instability; Gravity/acceleration sensitivity. All low pressure silicon piezoresistive sensors currently offer compromised performance: Limited to higher than desirable range; Down-rated; Have higher nonlinearity, zero drift and long term drift as compared to higher ranges specifications; Suffer from lower yields; Are Larger and more expensive; Suffer from excessive "g" sensitivity due to the large mass of the boss.

Past solutions to this problem were explored: Replacing the flat diaphragm with a single or double bossed diaphragm; Peripherally thinned bossed diaphragms. These innovations improved low pressure range performance, but fall short of needed specifications.

The crux of the problem is that current technology, which employs diaphragms to act as both the force collector and the sensing flexure, is too rigidly constrained to perform both tasks optimally. It is, therefore, the object of the present invention to provide an integral diaphragm-flexure structure, implemented in a single layer structure and a two layer structure, which incorporates the following features: Provides sufficient independent variables to optimize sensitivity and linearity; Removes piezoresistive strain gages from the thin diaphragm; Places them on a thicker beam (integral of linked); Employs no boss or a very small linking boss.

SUMMARY OF THE INVENTION

The present invention discloses pressure sensors based on an integral diaphragm-beam configuration. In one embodiment, a single layer integral beam pressure sensing die is shown. It consists of thicker beams formed on a thinner diaphragm. Piezoresistive strain gages are diffused, implanted, or affixed to, the thicker beam. It is understood that, besides constant width beams, other shapes may be uses such as tapered beams, cross beams and beams of various widths. The pressure causes the diaphragm to deflect, which compels the thicker beam to bend. The bending produces strains in strain gages which are located on the beam. The strain gages are connected in a Wheatstone bridge configuration in order to provide an output signal proportional to the pressure.

In second embodiment, two wafers are combined to form a two layer pressure integral structure comprising of a linked diaphragm-beam assembly. The first layer consists of a diaphragm with a linking boss in one embodiment or a small protrusion in another embodiment. The second layer consists of one or more beams and a central linking boss. Piezoresistive strain gages are diffused, implanted, or affixed to, the beams. The two wafers are bonded together using one of the available conventional wafer bonding techniques (i.e., anodic, fusion, glass frit, etc.), in order to link the boss or protrusion on the diaphragm with the boss on the beam(s). It is understood that, besides constant width beams, other shapes may be uses such as tapered beams, cross beams and beams of various widths. The pressure collected by diaphragm creates a deflection, which is linked to the beams by the linking bosses. The beams are compelled to bend. The bending produces strains in the strain gages. The strain gages are connected in a Wheatstone bridge configuration in order to provide an output signal proportional to the pressure.

Another embodiment of two layer structure is two overlapping dies bonded to a common Pyrex glass pedestal. Die #1 consists of a diaphragm with a sculptured outer protrusion. The diaphragm senses the pressure and converts it into a force. Die #2 consists of a force sensor, which senses the force developed in the diaphragm. The two overlapping dies are linked via the diaphragm protrusion. Generally, the dies are linked by using a small pre-stress. In some cases it is advantageous to design a gap between the two dies, which allows them to link up when the pressure reaches a predetermined value.

In another configuration, the beam wafer of the two wafer structure may be replaced by a second diaphragm wafer. The two diaphragms are linked by central protrusion. The piezoresistors are placed on the second diaphragm wafer. The pressure causes the first diaphragm to deflect, which compels the second diaphragm to bend. The bending produces strains in strain gages which are located on the diaphragm. The strain gages are connected in a Wheatstone bridge configuration in order to provide an output signal proportional to the pressure.

Diaphragm-beam configurations convert pressure into strain more efficiently than a diaphragm alone. The degree of efficiency depends on the relative geometries of the diaphragm and the beams. The dimensions of the diaphragm and the beams can be independently selected in order to increase sensitivity without compromising performance. Furthermore, the beams can be designed to be thick enough to present a stable substrate for the strain gages, while the diaphragms can be designed to be sufficiently compliant in order to respond to low pressures.

Another advantage of the present invention is that the beams in both embodiments act as a support for the diaphragm and limit its deflection. In the single layer embodiment, the thicker beams located on the centerline support the thinner diaphragm and reinforce it. In the second embodiment, the beams on the second layer provide a center support for the diaphragm of the first layer. In both cases, the combined structure becomes more stable and more resistant to ballooning, buckling, mid-plane stretching, etc.

In addition, the diaphragm-beam configuration permits the incorporation of stress isolation slots without creating a pressure leak path. The slots provide protection against in-plane stresses induced by the thermal mismatch intrinsic to die mounting.

The integral diaphragm-beam and diaphragm-diaphragm approaches offer the following advantages over prior art:

1. The strain gages are removed from the thin diaphragms and placed on thicker integral, or linked, flexure, which improves their stability.
2. In configurations employing longitudinal and transverse strain gages, the longitudinal piezoresistors are narrow and long while the transverse piezoresistors are wide and short. Placing the piezoresistors on beams, rather directly on the diaphragm, offers the capability of adjusting the beam geometry to maximize the strain in the piezoresistors. For example, utilizing narrow and long beams for the longitudinal piezoresistors and wide and short beams for the transverse piezoresistors.
3. Composite diaphragm-beam structures are inherently more efficient in converting pressure to strain since they permit optimizing the geometry independently.
4. Positioning the strain gages on the beams allows improved isolation from the in-plane stresses caused by package induced thermal stresses. In some configurations, isolation slots may be added to further reduce in-plane stresses.
5. For very low range pressure sensors, sensor mass must be minimized in order to reduce gravity error. Unlike the prior art low pressure sensors, which rely on a large boss for stress magnification, the diaphragm-beam sensors employ either no boss, a small linking boss or a small protrusion.

BRIEF DESCRIPTION OF THE DRAWINGS

FIGS. 5A and 5B show cross-sectional views of a second embodiment of the present invention of a two layer linked diaphragm-beam.

FIGS. 6A and 6C show a bottom view of two versions of the beam layer of FIG. 5.

FIG. 7 shows a cross-sectional view of the structure shown in FIG. 5 with a stress isolation slot.

FIG. 8 shows a bottom view of the beam layer of FIG. 7.

DETAILED DESCRIPTION OF THE INVENTION

Figure 1:
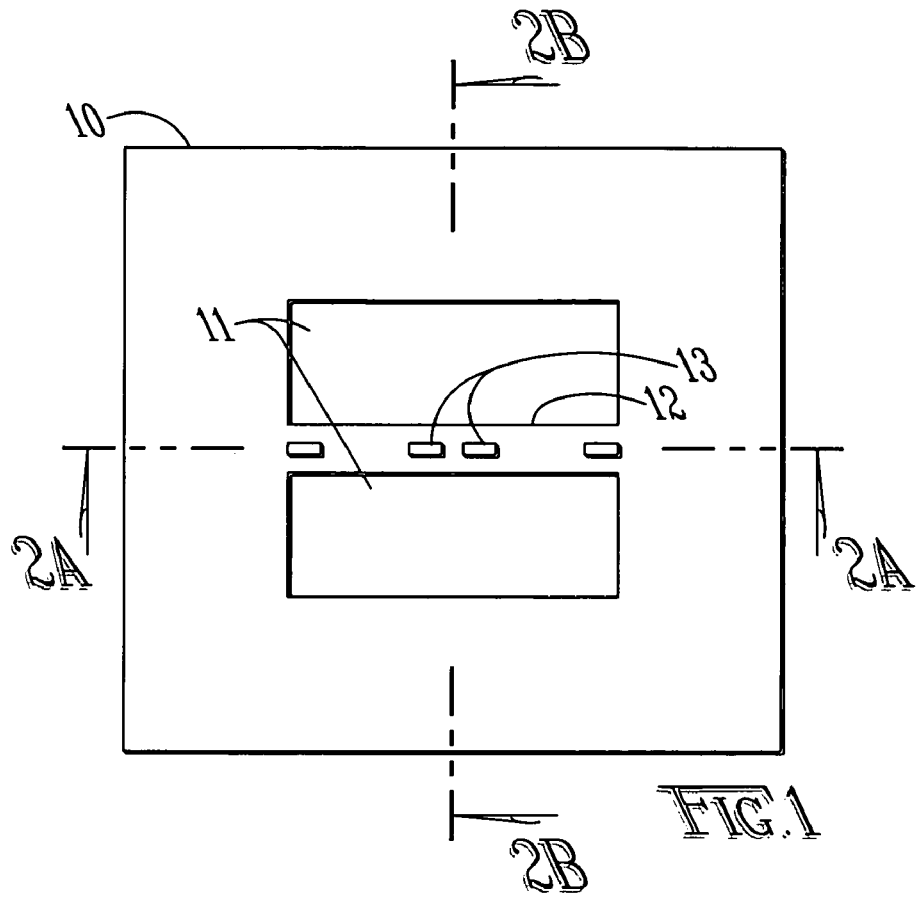
FIG. 1 shows a view of one embodiment of the present invention of a single layer integral diaphragm-beam using a constant width beam.
Figure 2A:
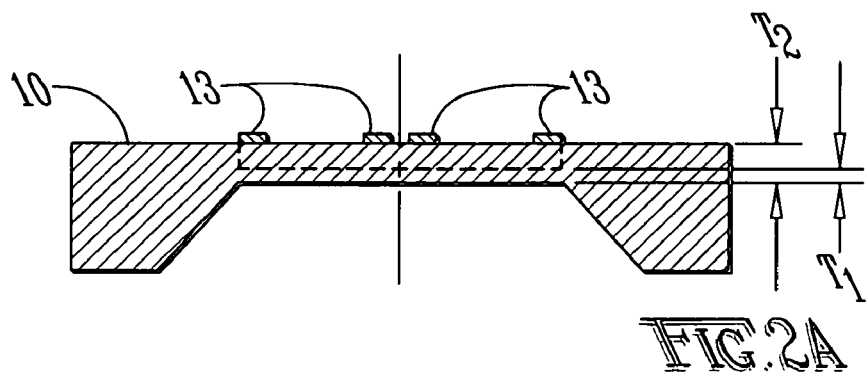
FIGS. 2A and 2B show cross-sectional views of FIG. 1.
Figure 2B:
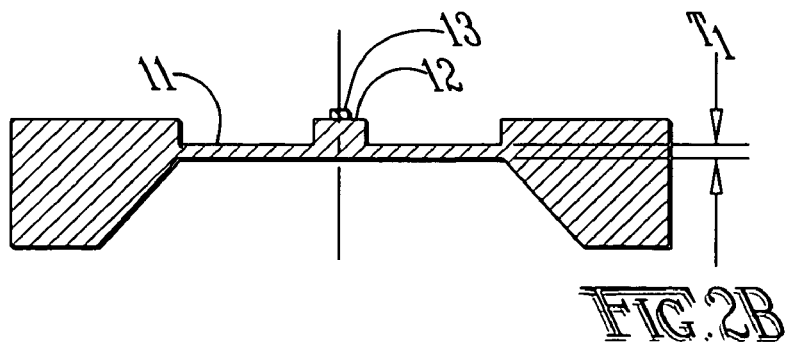

Referring to FIG. 1 the top view of pressure sensing die 10 is shown that measures pressure. Two cross-sectional views of die 10 are shown in FIG. 2A and FIG. 2B. In the shown embodiment, the bottom side of die 10 is etched to a predetermined depth in order to form a flat diaphragm of thickness T2. The top surface of the die 10 is further etched selectively around the beam to form a thinned area web/membrane 11 with thickness T1 while keeping the beam 12 at the original thickness T2. The end result is an integrated structure consisting of a constant width narrow thicker beam 12 formed along the centerline of the thinner diaphragm 11. Piezoresistive strain gages 13 are diffused, implanted, or affixed to, the narrow thicker beam. Two strain gages are place on or around the outer edge and two strain gages are placed around the center of the beam. When pressure is applied, the thin diaphragm 11 deflects. Its deflection is constrained by the thicker beam 12. This creates a force that compels the beam 12 to bend. The bending induces strain in strain gages 13 located on the beam 12. The strain gages are connected in a Wheatstone bridge configuration. A voltage applied to the bridge will provide an electrical output signal proportional to the pressure. As shown in FIG. 1, the area of diaphragm 11 employed to sense the pressure and convert it into a force, is considerably larger that the area of narrow beam 12. As a result, the process of converting pressure to force and the force into strain is magnified, which makes pressure sensing die 10 especially efficient for use in low pressure measurements.

Figure 3A:
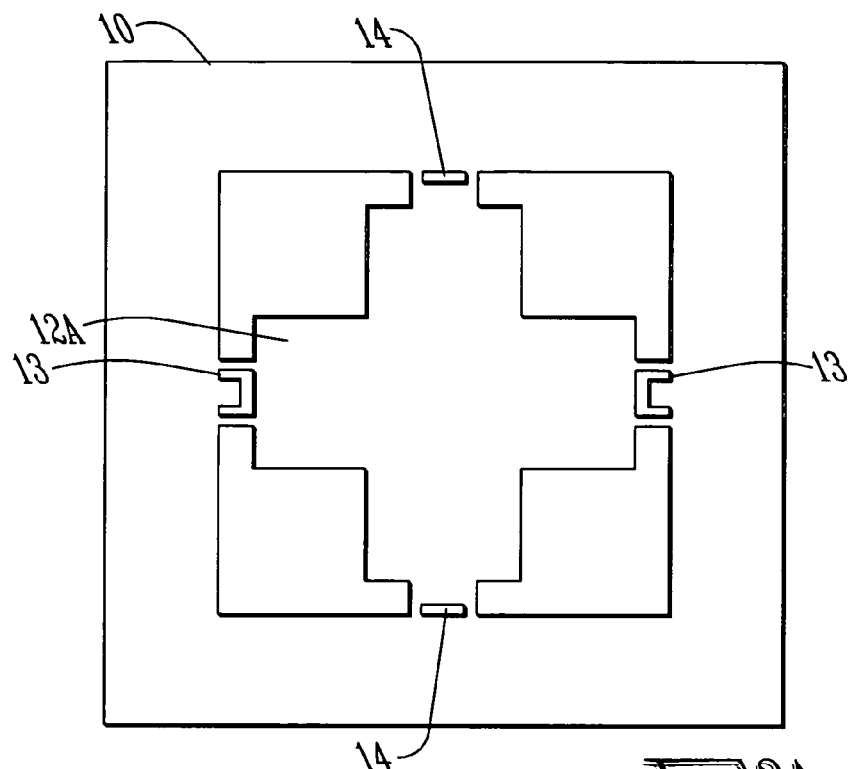
FIGS. 3A and 3B show views of a single layer integral beam version using diagonal beams with two types of narrow clamped ends.
Figure 3B:
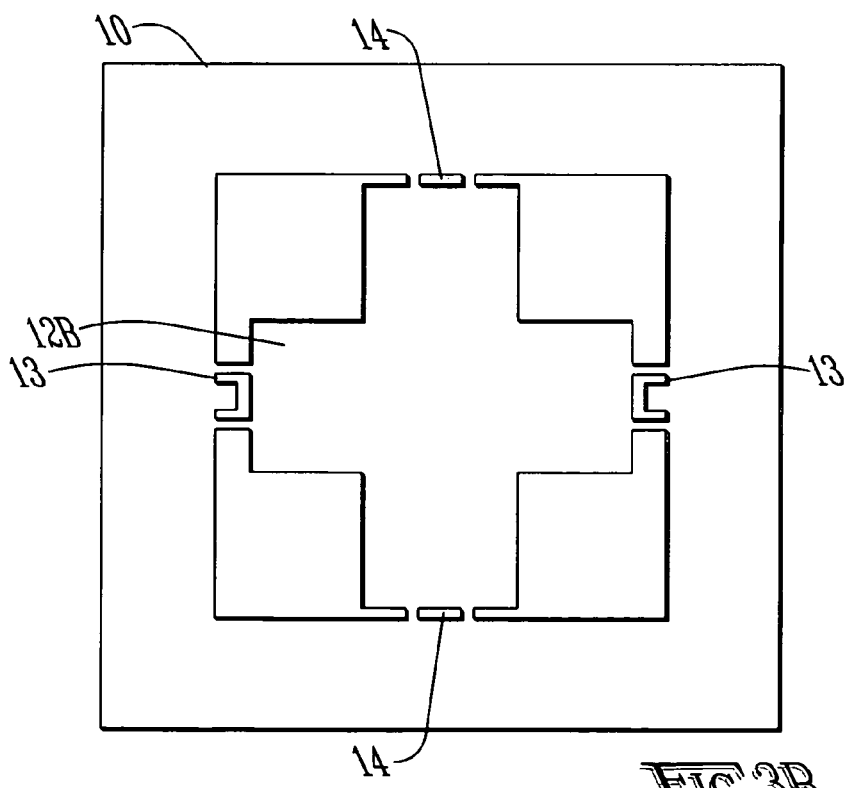

FIG. 3A shows another arrangement of die 10 with a diagonally shaped beam 12A with symmetrical narrower clamped ends in order to increase the stresses in the strain gages 13 and 14. The pressure-to-strain conversion efficiency increases while the displacement is reduced by the wide sections of the beam. FIG. 3B shows a similar arrangement except that beam 12B is further shaped to provide two types of clamped ends: Narrow and long sections for longitudinal piezoresistors 13; Wide and short sections for transverse piezoresistors 14.

Figure 4A:
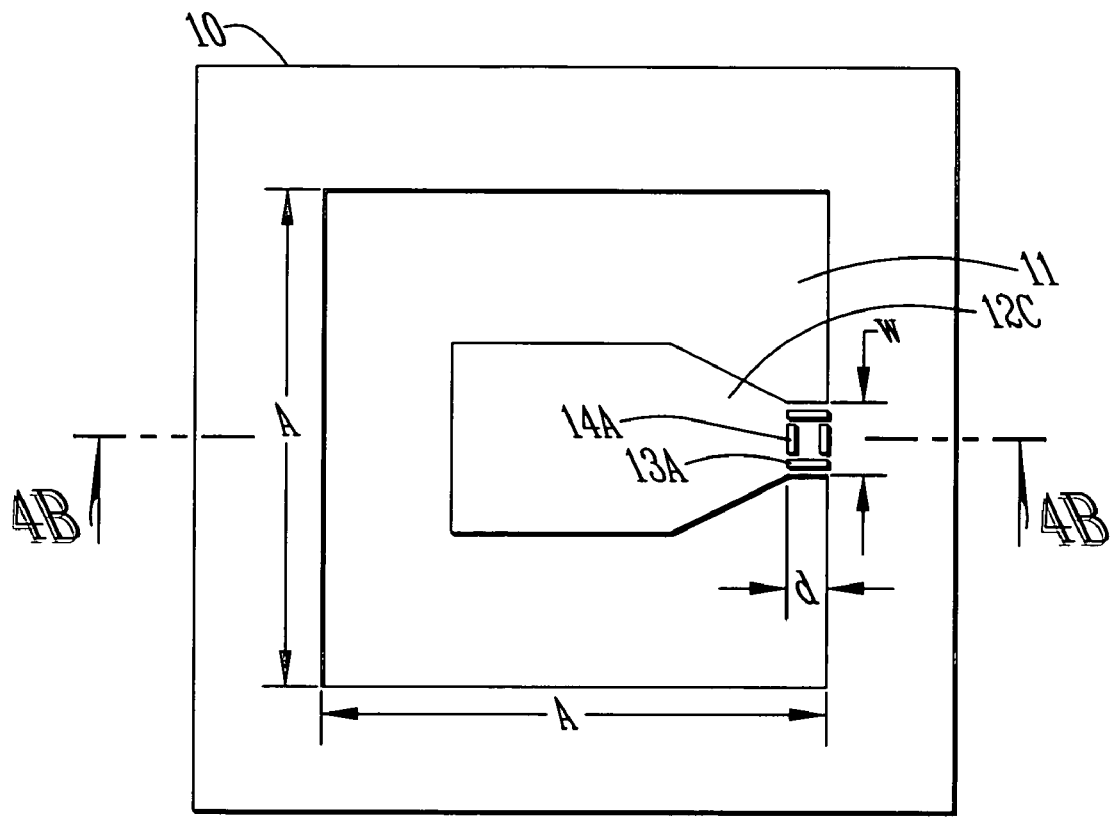
FIGS. 4A and 4B shows a cross-sectional view of a single layer integral beam version using a single beam.
Figure 4B:
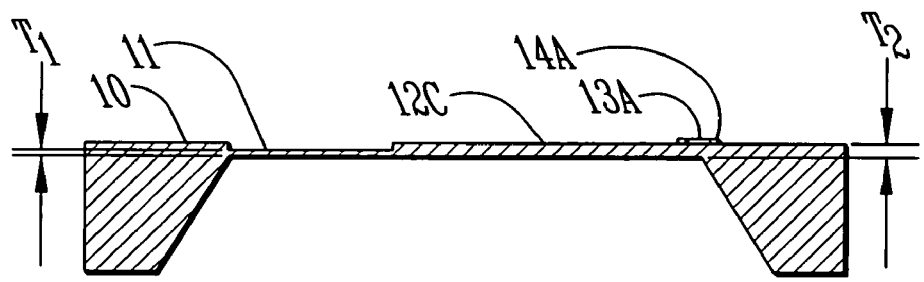

FIG. 4A and FIG. 4B show a top view and cross-sectional view of another implementation of sensing die 10 with a single beam 12C, which is fully surrounded by thinned web 11. Two pairs of piezoresistors are placed on the end area, which if is "w" wide and "d" long, near the clamped edge of beam 12C: The pair 13A for longitudinal and 14B for transverse stresses. This integral single cantilever beam configuration features higher sensitivity and improved isolation from package induced stresses.

Figure 6B:
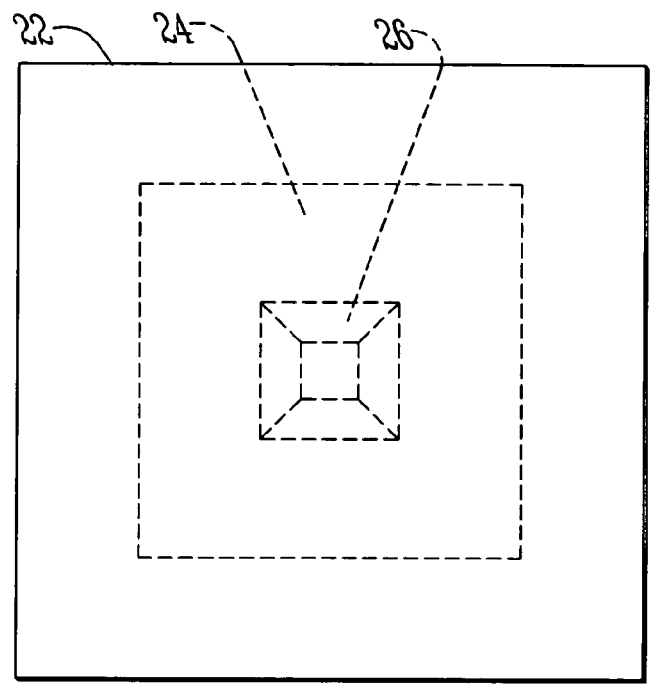
FIG. 6B shows a top view of the diaphragm layer of FIG. 5.

Referring to FIG. 5A, the cross-sectional view of two wafer composite die single cantilever configurations 20 and 20A are shown that measures pressure. In the shown embodiment of FIG. 5A, the composite die 20 is composed of diaphragm layer 22 and beam layer 21. FIG. 6B shows a view of diaphragm layer 22. The diaphragm wafer 22 is etched to a predetermined depth in order to form a diaphragm 24 with thickness T1 having a central boss 26, which faces boss 25 of beam layer 21 The two bosses are linked when the die 21 is bonded to die 22. In the embodiment shown in FIG. 5B the composite die 20A is composed of diaphragm layer 22A and beam layer 21. The wafer 22A is etched to form a flat diaphragm. The top surface of the diaphragm is sculptured by etching in order to form central protrusion 29 and thinned down diaphragm 24A. The central protrusion is bonded to boss 25 of die 22A.

Figure 6C:
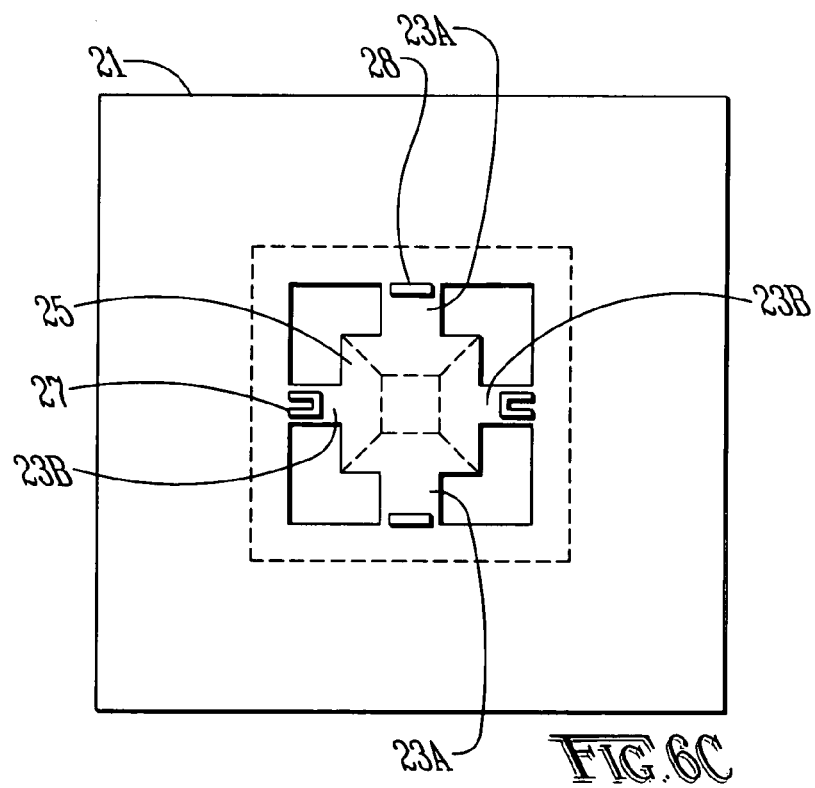

Both FIG. 5A and FIG. 5B employ beam die 21. The beam wafer is first etched in order to form a diaphragm with thickness T2 and boss 25. The surface of beam wafer 21 is selectively etched through to remove all the material surrounding beams 23. The result is a layer consisting of boss 25 suspended by two or more beams. The piezoresistive strain gages 26 are diffused, implanted, or affixed to, the surface of the beams 23. In the embodiment shown in FIG. 6A, the two beams 23 employ strain gages 26. One strain gage is positioned on, or around, the outer edge and the other one is positioned on, or around, the inside edge of beams 23. FIG. 6C shows another implementation of beam layer 21 consisting of boss 25 suspended by four beams designed to accommodate four piezoresistors positioned on the outer edges. Beams 23A have narrower sections to accommodate longitudinal piezoresistors 27 and beams 23B are wider to accommodate transverse piezoresistors 28. It is understood that the beams could be designed to have a variety of widths and lengths.

As sown in FIGS. 5A and 5B, first diaphragm wafer 22 and second beam wafer 21 are bonded together to form an integral structure 20 composed of a diaphragm linked to a beam. The pressure applied to thin diaphragm 24 forces boss 26 to deflect. The deflection is transmitted to linked beam boss 25, which causes beams 23 to bend. The bending produces strain in strain gages 26 in FIG. 6A and 27 & 28 in FIG. 6C. The strain gages are connected in a Wheatstone bridge configuration. A voltage applied to the bridge provides an electrical output signal proportional to the strain, which is proportional to the pressure. As shown in FIG. 5A and FIG. 5B the area of diaphragm 24 can be made large in order to create a relatively large force for low pressure applications, while beams 23 can be designed to be relatively short in order to optimize their force-to-strain sensing performance.

Referring to FIG. 7, the cross-sectional view of a stress isolated two wafer composite die 30 is shown. In this embodiment, two layer die 30 is composed of a diaphragm layer 22 and a slotted beam layer 31 featuring an isolation slot 32.

FIG. 8 shows a top view of beam layer 31. Beam layer 31 is similar to beam layer 21 with the exception of slot 32, which serves to isolate any in-plane stresses form reaching strain gages 26 positioned on beams 23. The isolation slot 32 may be implemented by conventional etching or by Reactive Ion Etching (RIE).

Figure 9A:
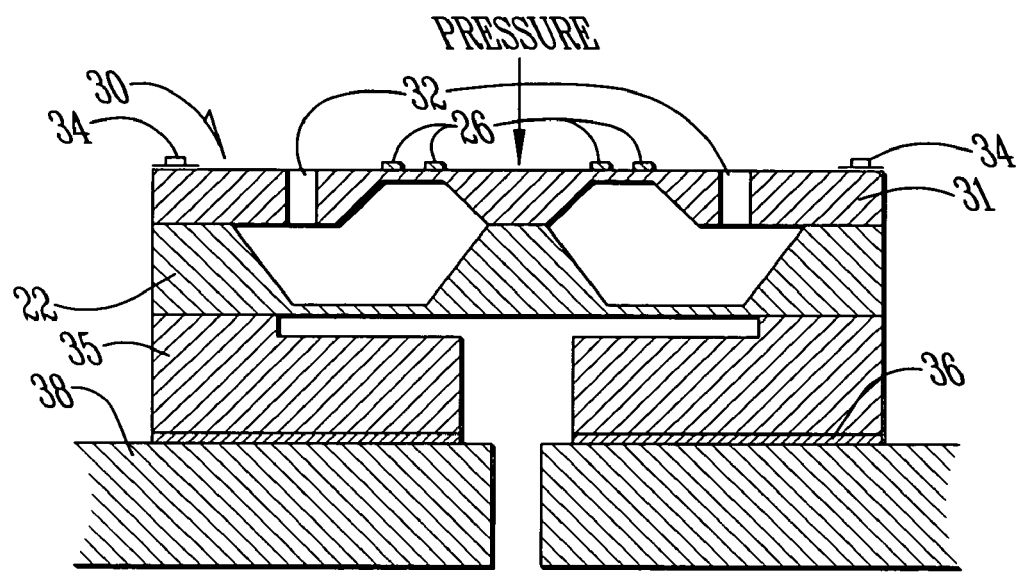
FIG. 9A shows a cross-sectional view of FIG. 7 with a bonded Pyrex base.

Referring to FIG. 9A, composite die 30, utilizing slotted beam wafer 31, is shown bonded to Pyrex base 35 and mounted on a substrate, or a header, 38 by elastic adhesive 36. The mismatch in thermal expansion coefficients between the die and substrate 38 creates in-plane stresses, which are prevented from reaching strain gages 26 by isolation slot 32.

Figure 9B:
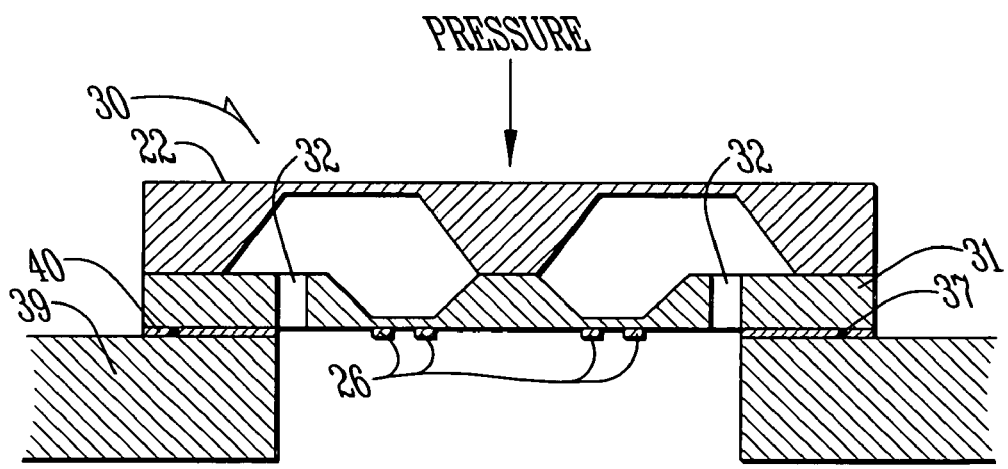
FIG. 9B shows a cross-sectional view the flip chip version of FIG. 7.

Referring to FIG. 9B, the composite die 30 utilizing slotted beam wafer 31 is mounted on substrate, or a header, 39 by flip chip technology. Flip chip mounting is advantageous since the strain gages 26 and the electrical interconnections 37 are protected from the pressure media. Solder balls 37 are used to make the electrical connections between the die and the substrate. Underfill layer 40 acts as a pressure seal. Isolation slot 32 prevents the die attach stresses from reaching the strain gages.

Figure 10A:
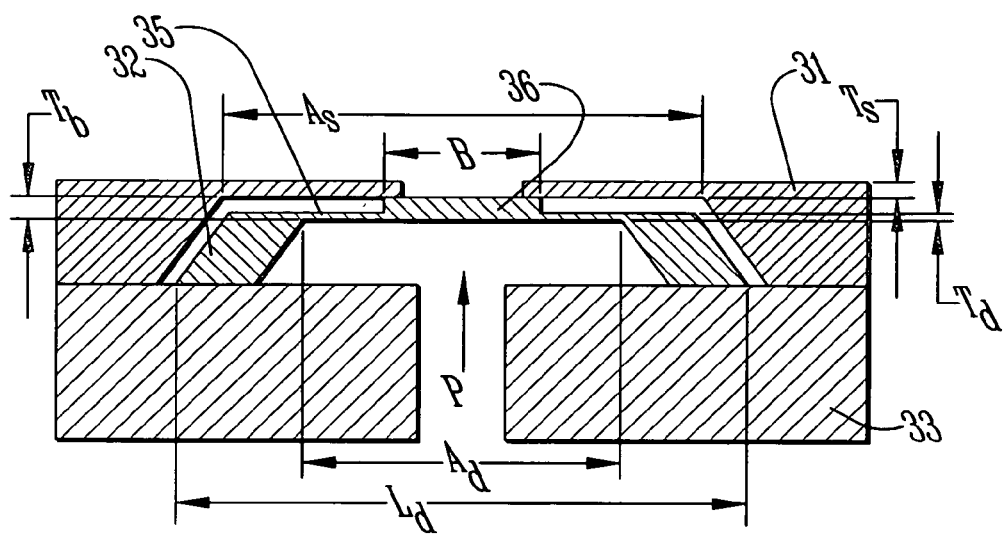
FIGS. 10A and 10B show a typical assembly of overlapping dies pressure sensor.
Figure 10B:
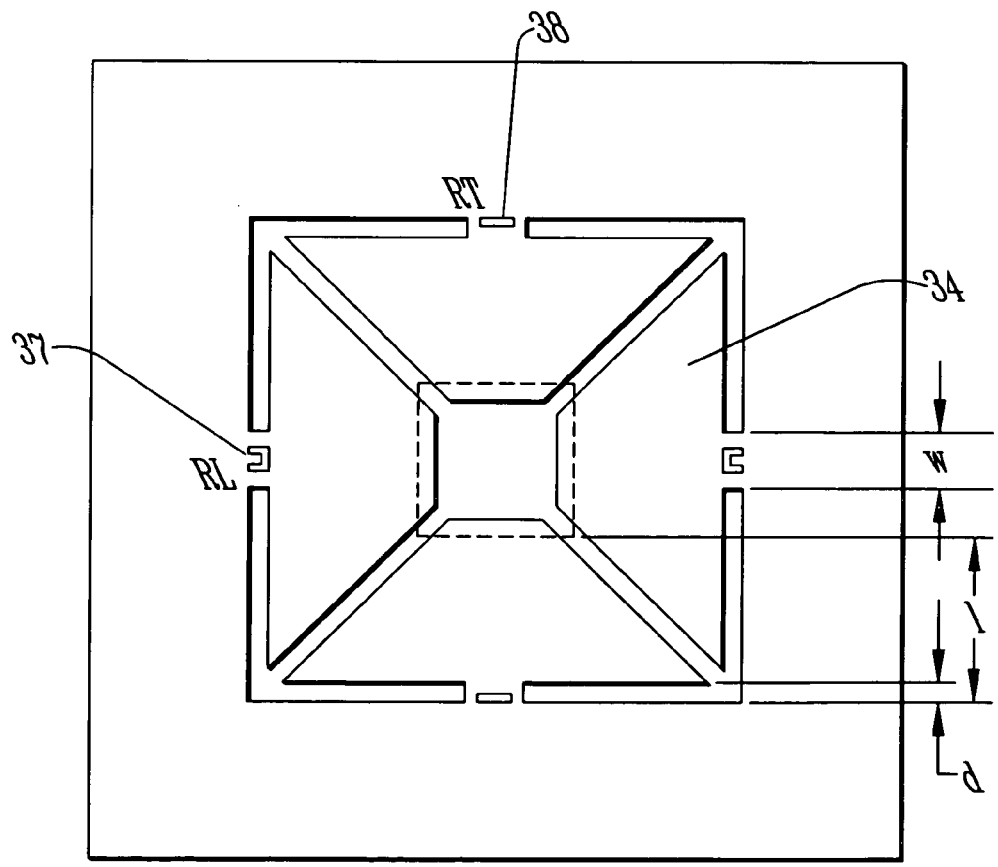

Referring to FIGS. 10A and 10B a typical assembly of overlapping dies pressure sensor is shown. First silicon wafer 32 is employed to implement Die #1. The wafer is etched from the back to create diaphragms 35 with active area (Ad×Ad) and thickness Tb. The first wafer 32 is then anodic bonded to Pyrex wafer 33 and etched in order to form square islands (Ld×Ld) on the Pyrex. The top surface of the islands is further thinned down selectively to thickness Td in order to shape an outer protrusion 36 (B×B). Second silicon wafer 31 is employed to implement Die #2. The wafer is etched from the back to create diaphragms with active area of (As×As) and thickness Ts. Its surface is etched through from the top in order to form an array of sensing beams 34 with length "l" and width 'w'. Piezoresistors 37 and 38 and metalized conductors are placed on the narrow section "d" of beams 34. The second wafer 31 is then anodic bonded to the Pyrex wafer 33 overlapping the separate square islands of first wafer 32. The version shown with a hole in Pyrex 33 is suitable for gage and differential pressures. Pressure "P" is applied through the vent hole in the Pyrex base 33. The pressure causes the diaphragm 35 to push upward. The outer protrusion 36 forces the beams to bend. This induces stresses in the piezoresistors 37 (RL) and 38 (RT).

Figure 13A:
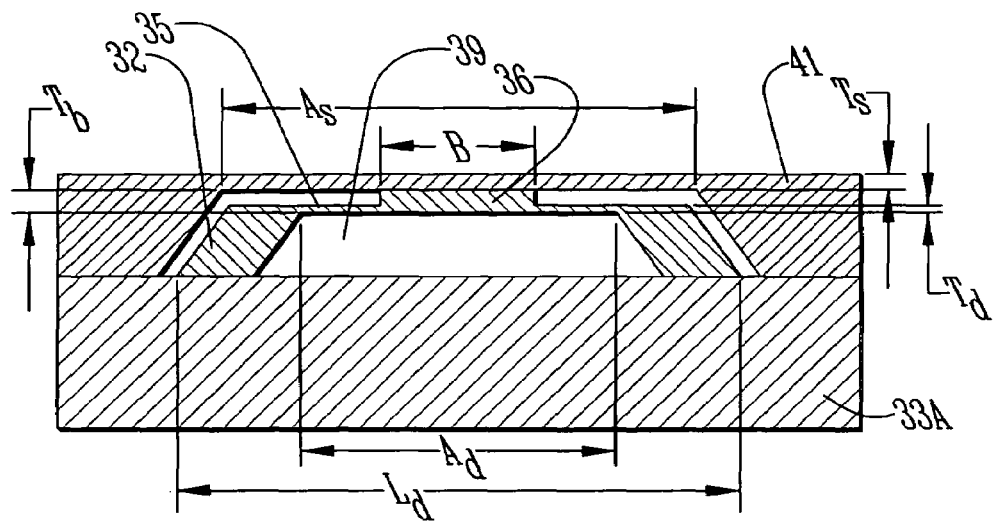
FIGS. 13A and 13B shows a "Clamped beams" version of FIG. 10.
Figure 13B:
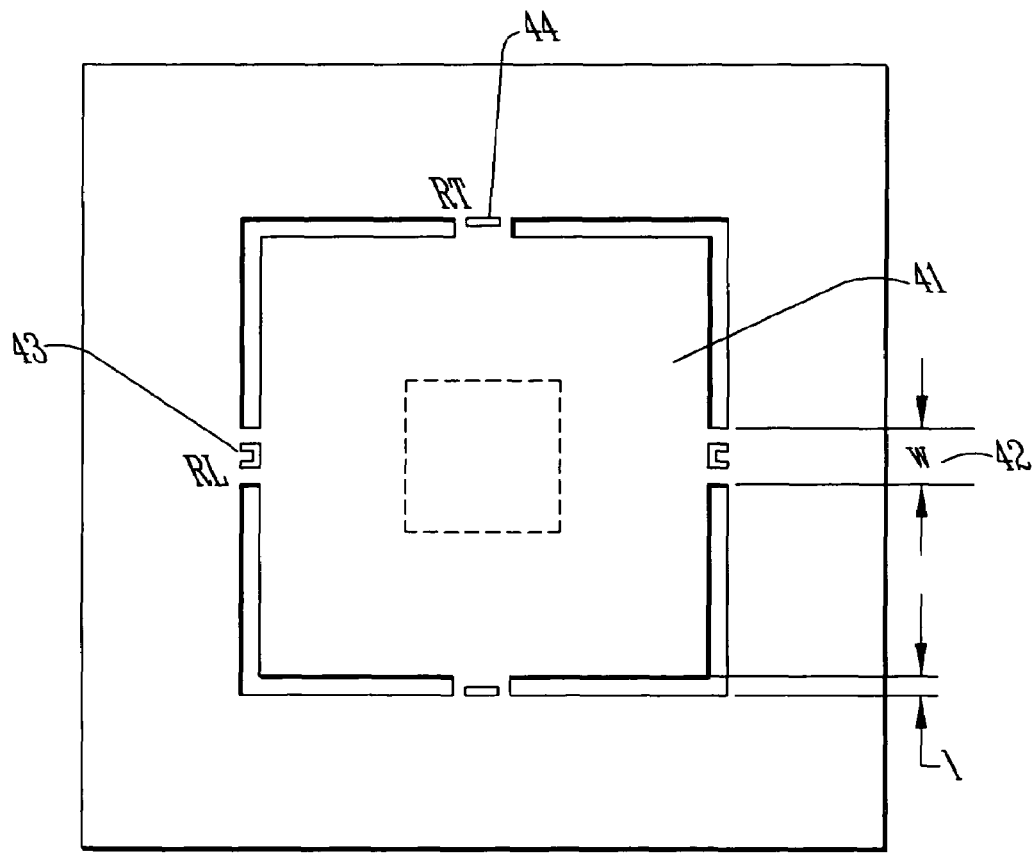

Referring to FIGS. 13A and 13B structure 41 with beams 42 is shown. "Clamped Beams" 42, with length "l" and width "w", replace the "End Supported" cantilever beams 34 shown in FIG. 10. Four piezoresistors, two each (RL) 43 and (RT) 44, are placed on beams 42 to measure the force developed in the beams.

Figure 11A:
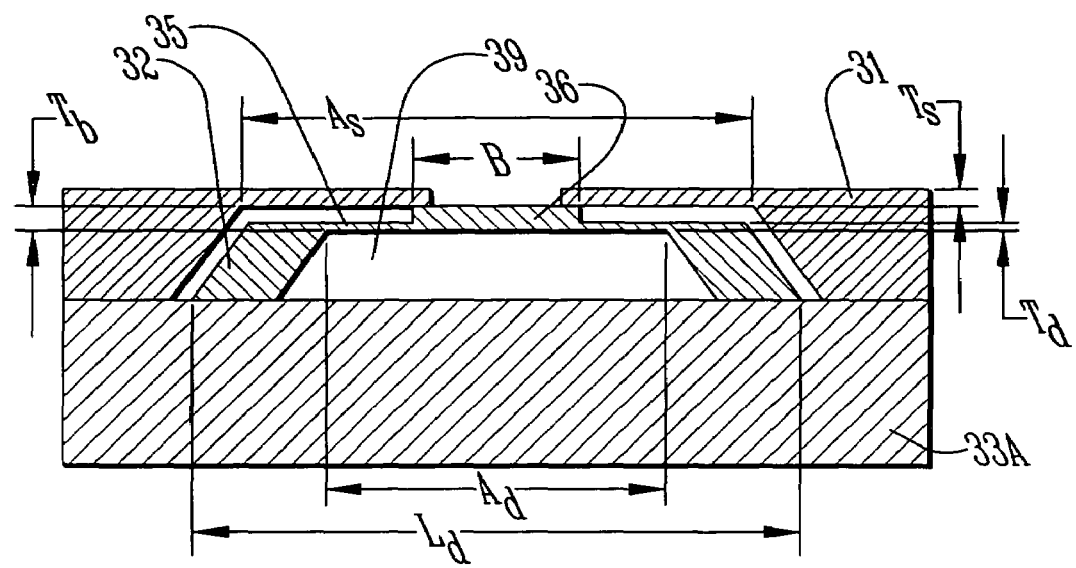
FIGS. 11A and 11B show a typical assembly of overlapping dies pressure sensor suitable for absolute pressure measurements.
Figure 11B:
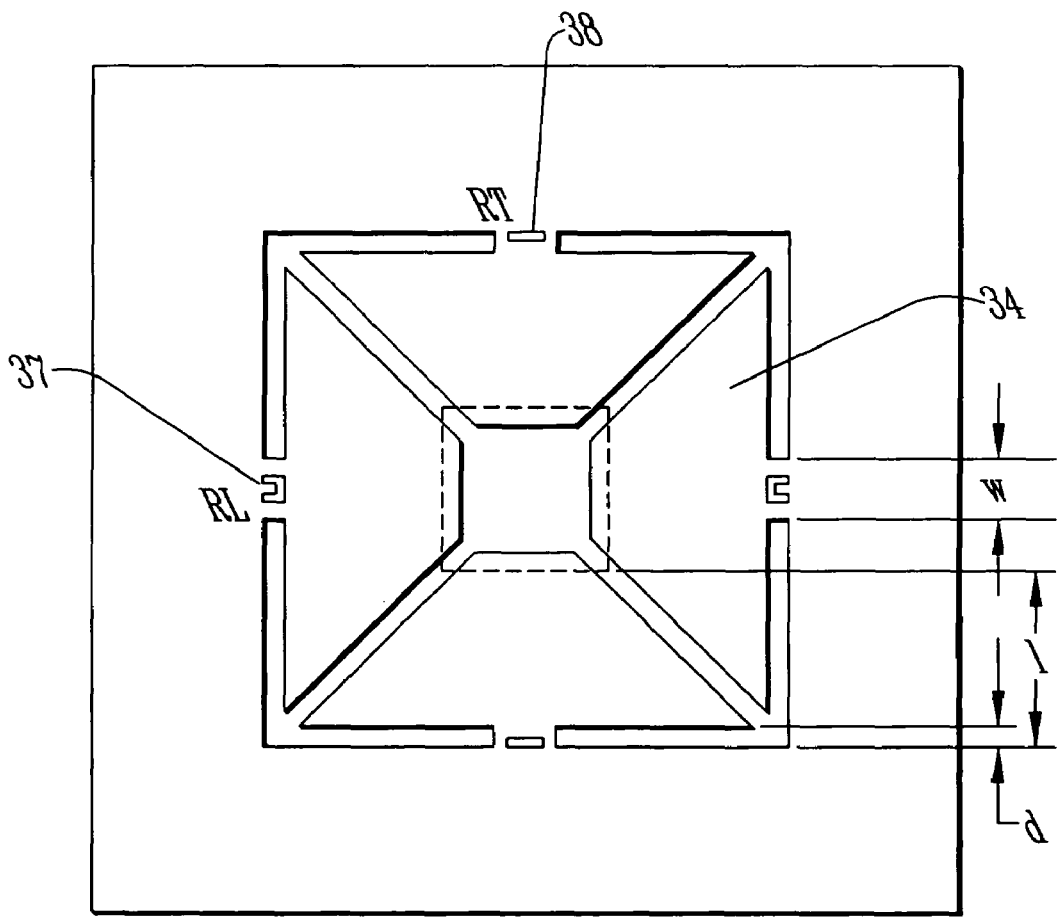

The version shown in FIGS. 11A and 11B is suitable for absolute pressure measurements since the Pyrex base 33A has no vent hole. Die 32 is anodic bonded to the Pyrex 33A in vacuum, which seals vacuum inside the reference pressure chamber 38. During the bonding, beam die 31 is designed to make contact with boss 36 while diaphragm 32 is deflected by barometric pressure (approximately 1000 mbar). This implementation is suitable for measuring absolute pressures below atmospheric pressure. Pressure under 1000 mbar causes the diaphragm 35 to move up, which forces boss 36 to push the beams 34. The strain gages on beams 34 provide an output that corresponds to the applied absolute pressure under around 1000 mbar.

Figure 12A:
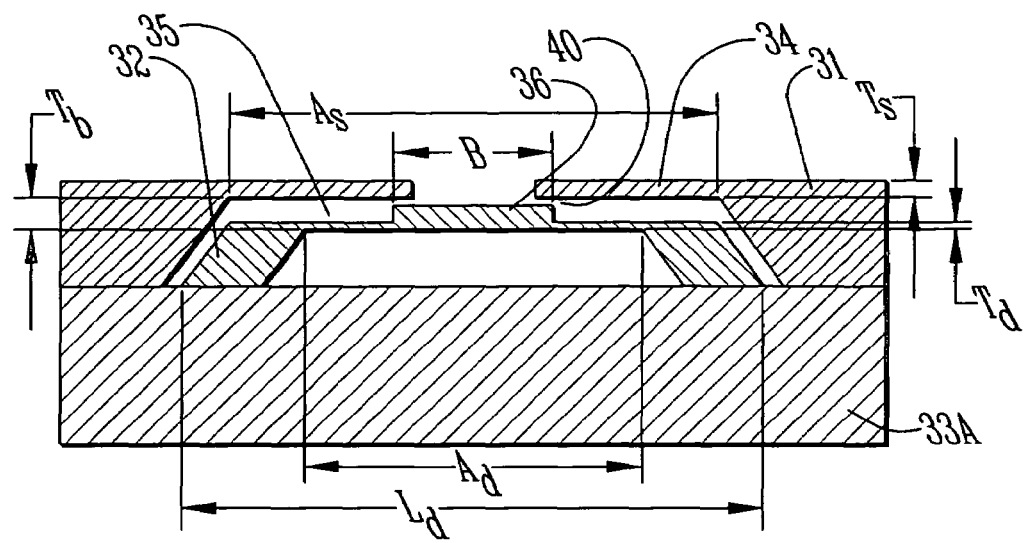
FIGS. 12A and 12B show a gap version of FIG. 12 absolute pressure sensor version.
Figure 12B:
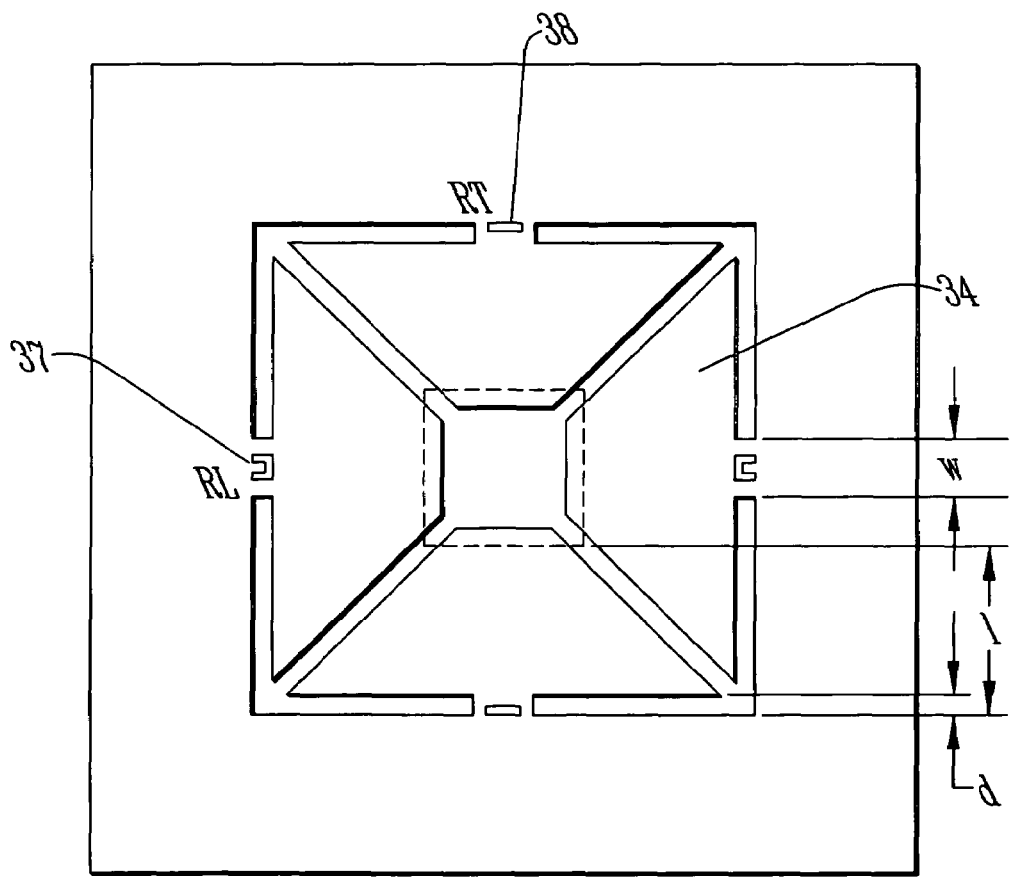

Referring to FIGS. 12A and 12B, an absolute pressure sensor version is shown with a small gap 40 between the two dies 31 and 32. The gap permits the diaphragm to remain detached from the beams until the pressure reaches a predetermined value. When the pressure is at barometric pressure, the outer protrusion 36 is disengaged from the beams and the output of the sensor is zero. As the pressure decreases, the protrusion 36 moves up. At a predetermined value (i.e. 100 mbar absolute), the gap 40 closes, the protrusion 36 contacts the beams 34 and commences to push them up, which provides an output voltage. This feature makes the gap version of the overlapped dies ideally suited for measuring low absolute pressures (i.e. 0-100 mbar absolute). The gap approach can also be useful in gage and differential pressure sensors.

In general, the overlapping dies are designed to contact each other with a prescribed pre-stress designed to sustain a permanent link between the diaphragm outer boss and the beams. The thickness of the overlapping silicon wafers must have close tolerances in order to achieve the optimum link between the dies. In the gap version, the gap dimension has to be controlled.

Typical Applications:

In general, the composite pressure sensing dies make improved low pressure sensors. The dual layer and the overlapping dies offer some additional benefits:

1. Frequently pressure sensors provide an output of 0.5 V to 5 V. The 0.5 V "live zero" allows the associated data acquisition system to perform null diagnosis for sensor health monitoring in critical applications such as aircraft, etc. In current technology, the live zero (i.e. 0.5V) is produced artificially by offsetting the output of the sensor electrically, which provides a limited sensor health information. On the other hand, the linking of the diaphragm and the beam in the dual die version allows inducing a predetermined pre-stress which represents a pressure output (i.e. 10% of full range equals 0.5V). This approach provides a superior health monitoring tool since the diagnosis of a true 10% FS "live zero" confirms that the pressure sensor is operational by confirming that its internal components, consisting of the pressure sensing diaphragm and the linked sensing beams, are functioning correctly.

2. Mechanical pressure switches are being replaced by electronic switches in critical applications. The gap version of the overlapping dies sensor acts like an analog pressure switch with a significantly improved resolution and accuracy.

3. In water level sensing, in order to eliminate sensor drifts the sensors have to be withdrawn periodically, at a large expense, for re-calibration. The dual die overlapping construction can be designed to implement momentary uncoupling of the diaphragm from the beams (by using an actuator). This makes it possible to perform auto-null measurements.

I claim:

1. A dual die pressure sensor, comprising:
   (a) a first die of a semiconductor material etched in the form of a diaphragm with a center boss;
   (b) a second die of a semiconductor material etched in the form of a structure comprising a center boss supported by at least two beams; and
   (c) at least one strain gauge placed on each beam;
   (d) wherein said first and second dies are joined causing the boss of the first die to be linked to the boss of the second die.

2. The pressure sensor of claim 1, wherein each of the beams comprises an end section with a clamped edge, and wherein the end sections of said beams at the clamped edges of said beams are narrowed down.

3. The pressure sensor of claim 1, wherein the second die comprises a stress isolation slot at least partially circumscribing the beams.

4. A dual die pressure sensor, comprising:
   (a) a first die of a semiconductor material etched in the form of a flat diaphragm with a center protrusion formed by thinning regions of the surface of the diaphragm;
   (b) a second die of a semiconductor material etched in the form of a structure comprising a center boss supported by at least two beams;
   (c) at least one strain gauge placed on each beam;
   (d) wherein said first and second dies are joined causing the center protrusion of the first die to be linked to the boss of the second die.

5. The pressure sensor of claim 4, wherein each of the beams comprises an end section and a clamped edge, and wherein the end sections of said beams at the clamped edges of said beams are narrowed down.

6. The pressure sensor of claim 4, wherein the second die comprises a stress isolation slot at least partially circumscribing the beams.

7. A method for manufacturing a pressure sensor, comprising the steps of:
   (a) etching a die of a semiconductor material in the form of a flat diaphragm of first thickness;
   (b) forming a beam with the predetermined first thickness by thinning down regions of the diaphragm exterior surface to a smaller second predetermined thickness; and
   (c) placing a plurality of strain gauges on said beam.

8. The pressure sensor of claim 7, wherein the beam is formed along the center line of the diaphragm, runs the length of the diaphragm, and is clamped at each end edge to the die, and wherein at least one of the strain gauges is placed near at least one of the clamped edges of the beam and at least one of the strain gauges is placed at about the center of the beam.

9. The pressure sensor of claim 7, wherein said beam is formed such that it is only clamped at one end edge to the die and wherein at least one of the strain gauges is placed in a longitudinal orientation and at least one of the strain gauges is placed in a transverse orientation, each near the clamped edge of said beam.

10. The pressure sensor of claim 7, wherein said beam is formed in the shape of a cross and is clamped at each of four end edges to said die, and wherein at least one of the strain gauges is placed in a longitudinal orientation and at least one of the strain gauges is placed in a transverse orientation near each clamped edge of said beam.

11. The pressure sensor of claim 10, wherein end sections of said beams at the clamped edges are narrowed down.

12. A pressure sensor, comprising:
   (a) a first die of a semiconductor material comprising a flat diaphragm having a center protrusion, formed by thinning down regions of the exterior surface of said diaphragm;
   (b) a Pyrex glass base bonded to said first die;
   (c) a second die of a semiconductor material etched in the form of a beam array having a plurality of beams; and
   (d) at least one strain gauge placed on each beam;
   (e) wherein said second die overlaps said first die and is bonded to said Pyrex glass base.

13. The pressure sensor of claim 12, wherein said beam array of the second die comprises cantilever beams.

14. The pressure sensor of claim 12, wherein said beam array of the second die comprises clamped beams.

15. The pressure sensor of claim 12, wherein the second die links with said center protrusion of the first die by applying a pre-stress.

16. The pressure sensor of claim 12, wherein a predetermined gap is created between the second die and the center protrusion of the first die.

17. The pressure sensor of claim 12, wherein the Pyrex glass base comprises a vent hole for measuring gauge and differential pressures.

18. The pressure sensor of claim 12, wherein the Pyrex glass base has no vent hole, and wherein a vacuum is sealed inside the first die for measuring absolute pressures.

* * * * *